H. G. DITTBENNER.
HORIZONTAL BAND SAW MILL.
APPLICATION FILED APR. 24, 1907.

919,556.

Patented Apr. 27, 1909.
3 SHEETS—SHEET 1.

WITNESSES:
R. P. Vicks
A. H. Opsahl

INVENTOR
H. G. Dittbenner
By his Attorneys,
Williamson & Merchant

H. G. DITTBENNER.
HORIZONTAL BAND SAW MILL.
APPLICATION FILED APR. 24, 1907.
919,556.
Patented Apr. 27, 1909.
3 SHEETS—SHEET 2.
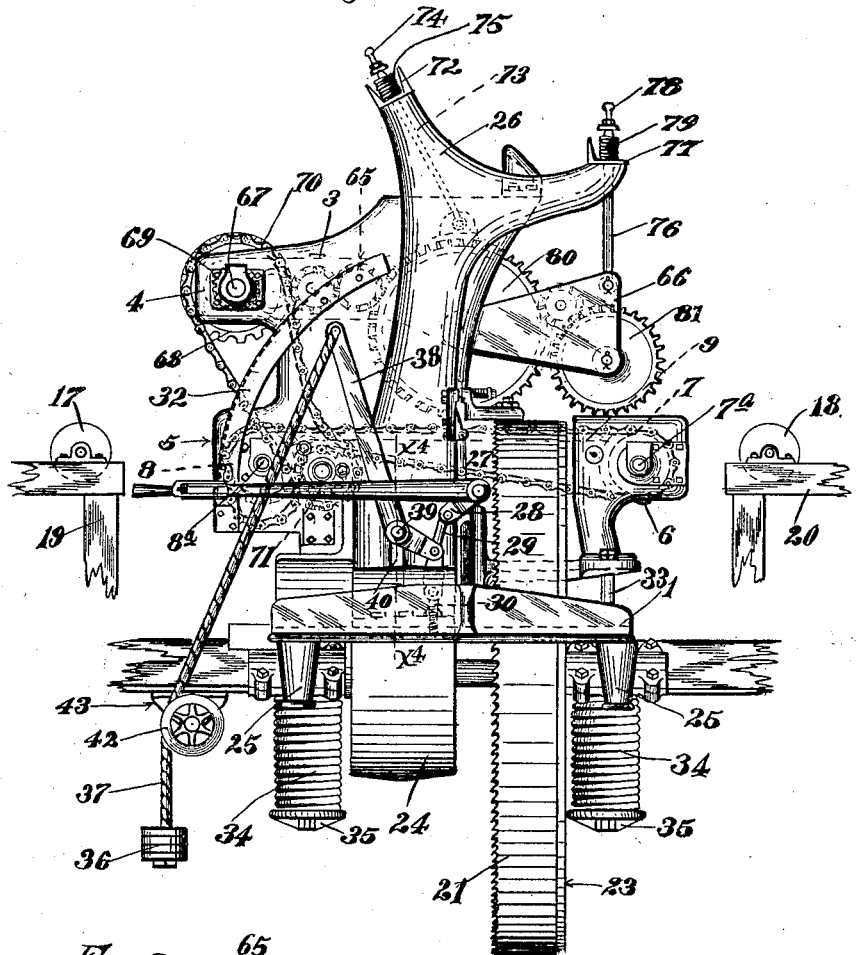
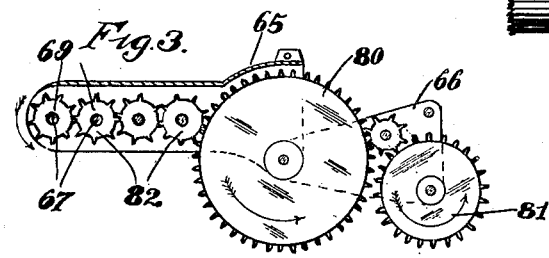
WITNESSES:
R. P. Hicks
A. H. Opsahl
INVENTOR:
H. G. Dittbenner
By his ATTORNEYS:
Williamson & Merchant

UNITED STATES PATENT OFFICE.

HERMANN G. DITTBENNER, OF MINNEAPOLIS, MINNESOTA.

HORIZONTAL BAND-SAW MILL.

No. 919,556.  Specification of Letters Patent.  Patented April 27, 1909.

Application filed April 24, 1907. Serial No. 369,977.

*To all whom it may concern:*

Be it known that I, HERMANN G. DITTBENNER, a citizen of the United States, residing at Minneapolis, in the county of Hennepin and State of Minnesota, have invented certain new and useful Improvements in Horizontal Band-Saw Mills; and I do hereby declare the following to be a full, clear, and exact description of the invention, such as will enable others skilled in the art to which it appertains to make and use the same.

The invention consists of the novel devices and combinations of devices hereinafter described and defined in the claims.

In the accompanying drawings which illustrate the invention, like characters indicate like parts throughout the several views.

Figure 1:
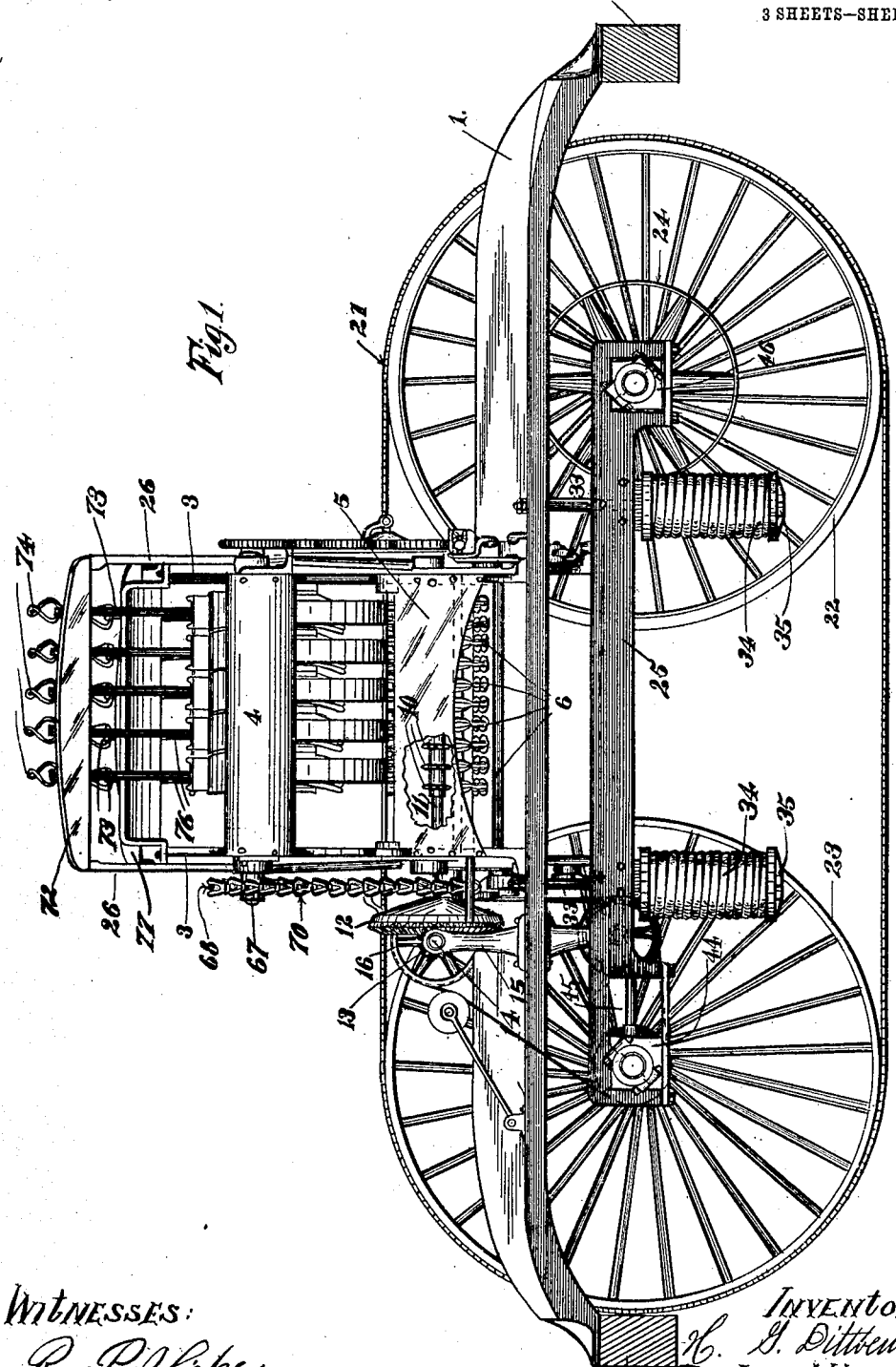
Figure 5:
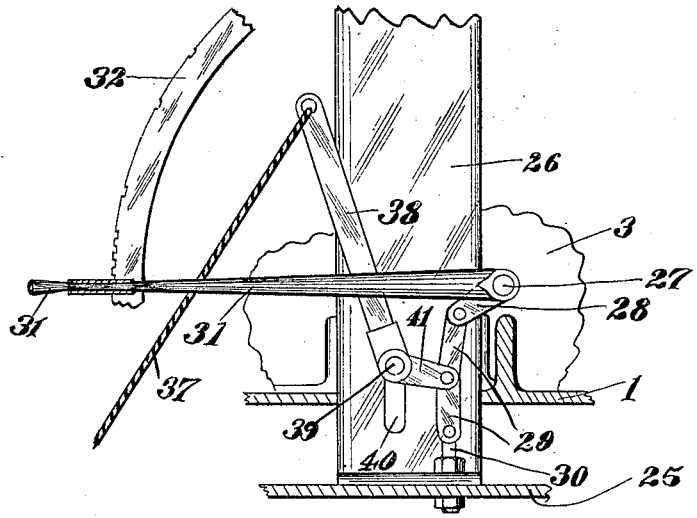
Figure 4:
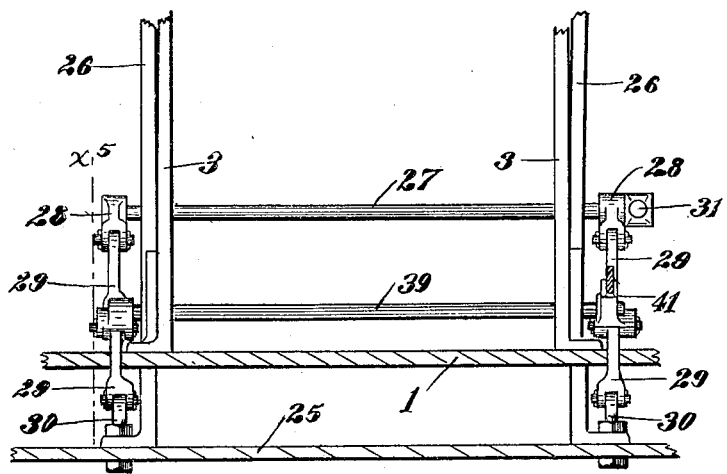

Referring to the drawings: Figure 1 is a front elevation of the improved horizontal band saw mill; Fig. 2 is a right side elevation of the same; Fig. 3 is a detail in side elevation, showing the so-called floating frames of the overhead feed device; Fig. 4 is a vertical section taken transversely of the machine on the line $x^4$ $x^4$ of Fig. 2, some parts being broken away; and Fig. 5 is a vertical section taken on the line $x^5$ $x^5$ of Fig. 4, some parts being broken away.

The main frame of the machine, which, as shown, is in the form of a heavy cast base 1, is bolted or otherwise rigidly secured to timbers 2 of the floor or other suitable supporting structure. Rising from and rigidly secured to the main frame 1, is a pair of laterally spaced pedestals 3 which, as shown are tied together transversely of the machine by tie bars 4 and 5.

The log or slab feeding device of the saw mill proper is preferably made up of a multiplicity of parallel laterally spaced feed chains 6 that run over suitable guide sprockets 7 and 8 (shown by dotted lines in Fig. 2) and the shafts $7^a$ and $8^a$ of which are journaled in suitable bearings on the main frame 1. The working or upper portions of these chains preferably run over a suitable supporting deck 9 suitably secured to the main frame 1 and shown by dotted lines in Fig. 2. The under portion of each chain 6 runs over a sprocket 10, which sprockets are carried by a shaft 11 mounted in suitable bearings on the main frame 1. At its left hand end, as viewed in Fig. 1, this shaft is provided with a bevel gear 12 that meshes with a bevel pinion 13 carried by a short counter-shaft 14 mounted in bearings 15 on the said main frame 1 and provided, as shown, with a pulley 16.

As shown in Fig. 2, the numeral 17 indicates a feed roller which delivers to the feed chains 6, and the numeral 18 indicates a feed roller which receives from said feed chain, said feed rollers being mounted on suitable supports 19 and 20, respectively.

In this improved machine the band saw 21 runs over saw guiding wheels 22 and 23, the former of which carries a driving pulley 24, as shown, and these wheels are journaled in suitable bearings carried by a vertically adjustable supplemental frame 25. This supplemental frame 25 is suspended from the main frame 1 with freedom for vertical adjustments by means of spring connections and coöperating auxiliary counter balancing mechanism which includes means for holding the said supplemental frame parallel in all of its vertical adjustments to a horizontal or initial position. The said parallel connections include a pair of vertically disposed guide posts 26 that are rigid on the supplemental frame and work in vertical guideways in the main frame pedestals 3, see particularly Figs. 4 and 5; and they also include a rock shaft 27 mounted in suitable bearings on the main frame 1 and provided with parallel arms 28 that are connected to the said supplemental frame, preferably by toggle links 29 and nutted anchoring bolts 30. The nutted anchoring bolts 30 make the said toggle connections vertically adjustable for the purpose of properly leveling up the supplemental frame in a longitudinal direction. The rock shaft 27 is provided with an operating lever 31 which by means of a latch segment 32 secured to one of the frame pedestals 3 is adapted to be locked in different adjustments, to thereby hold the supplemental frame set in different vertical positions with the working portion of the saw at different desired elevations with respect to the lower feed devices, shown as afforded by the feed chains 6.

The spring supports between the main and supplemental frame are preferably afforded by rods 33 and coiled springs 34, which rods are suspended at their upper ends from the main frame and are provided at their lower ends with enlarged heads 35 between which and the supplemental frame, the said springs 34 are interposed, as best shown in Fig. 1. These springs 34 of which, as shown, there are four located two on each side of the band saw, are arranged to sustain or support a very considerable part of the weight of the supplemental frame, the saw wheels 22 and 23, the saw 21 and other parts carried by the said supplemental frame.

The auxiliary counter weighting device preferably comprises a weight 36 which is connected by a cable 37 to an arm 38 of a rock shaft 39, which rock shaft is mounted in suitable bearings in the main frame pedestals 3 and works through vertical slots 40 in the supplemental frame pedestals 26 (see Figs. 4 and 5). This rock shaft 39 is provided with a pair of parallel arms 41 that are connected to the intermediate joints of the respective toggle connections 29 (see Fig. 5). The slots 40 permit the free vertical movements of the pedestals 26 under vertical adjustments of the supplemental frame 25. The weight suspending cable 37 runs over an idle guide sheave 42 mounted on a suitable fixed support 43. The arrangement of the arm 38 with respect to the spring 34 is such that when the supplemental frame 25 is lowered and the said springs are compressed to the greatest extent, said lever stands in its highest position so that its operative length or effective leverage is at the minimum. When the said supplemental frame is raised by an upward movement of the operating lever 31, the said lever 38 moves toward or more closely approaches a position at a right angle to the upper portion of the cable 37, so that the operative length or effective leverage of said lever increases. This lever, therefore, acts as a compensating device which increases the effective lifting force of the weight 36 approximately in proportion to the decreasing sustaining power of the springs 34 when the supplemental frame is raised and the said springs are permitted to expand. This compensating action is very important because the adjustment of the counterpoising devices made up of the springs and counter weight should always be such as to very nearly but never quite sustain the entire weight of the supplemental frame and parts carried thereby, and thus make it an easy matter to raise the supplemental frame by means of the lever 31 and yet always have sufficient surplus of load on the said supplemental frame to hold the saw down to its work.

The saw guiding wheel 23 is preferably mounted for horizontal sliding adjustments with respect to the saw guiding wheel 22, for the purpose of setting the wheel 23 against the saw 21 to put the latter under strain. To this end, the saw guiding wheel 23 is journaled in laterally spaced bearing boxes 44 that are mounted to slide in seats 45 formed in the adjacent end portions of the supplemental frame 25. In practice, the boxes 44 are preferably connected to a saw tension device set forth and claimed in my copending divisional application filed May 18, 1908, under S. N. 433,537. The saw guiding wheel 22 is the driving member, and its shaft is journaled in laterally spaced bearing boxes 46, which boxes are held in suitable seats in the right-hand prongs of the supplemental frame 25, and one of which is capable of a slight horizontal sliding movement so as to impart a slight oscillatory movement to the saw wheel 22 for the purpose of alining or adjusting the same to the saw. This sliding box 46, in practice, is preferably subject to a saw lead adjuster, set forth and claimed in my copending divisional application filed May 18, 1908, under S. N. 433,538.

In connection with this improved machine, I also provide overhead feed mechanism of novel construction and relative arrangement. This device, as shown, comprises a pair of pivotally connected floating frames 65 and 66, the former of which is pivotally connected at one end to the main frame pedestals 3, and at the axis of which pivotal connection is a shaft 67 suitably journaled in said pedestals 3 and provided with a sprocket 68 and a spur pinion 69. A sprocket chain 70 runs over the sprocket 68 and over a sprocket 71 on the shaft 11 (see Figs. 1 and 2). As shown, there is a multiplicity of the said pivotally connected floating frames 65 and 66 located side by side, the said frames 65 being pivotally mounted at their forward ends on the shaft 67, and the said shaft 67 being provided with a gear 69 for each frame 65. The frames 65, at their free ends, are yieldingly supported in part from a transverse bar 72 which rigidly ties together upwardly projecting prongs of the supplemental frame pedestals 26, and as shown, this is accomplished by rods 73 having nuts 74 at their outer ends between which and said bar 72 coiled springs 75 are interposed. The free ends of the frame 66 are in a similar manner supported in part by rods 76 attached thereto and passed through a transverse bar 77 that rigidly connects rearwardly extended prongs of the pedestals 26. These rods 76 are provided at their upper ends with nuts 78 between which and the bar 77 coiled springs 79 are interposed. Sharp toothed spur gears 80 are pivotally mounted on the frame 65 with their axes concentric to the pivotal connection between the coupled frames. Sharp toothed spur gears 81 are pivotally mounted on the free ends of the frame 66. A train of spur pinions 82 on each frame 65 transmits motion from the corresponding spur pinions 69 of the shaft 67 to the coöperating spur gear 80. An intermediate spur pinion 83 on each frame 66 transmits motion from the corresponding gear 80 to the coöperating gear 81. The gears 80 and 81 are adapted to directly engage with the upper surface of the slab, log or board that is being fed to the saw, and all of these gears are capable of independent vertical movement so as to maintain continuous engagement therewith, regardless of any irregularities in the upper surface of such materials. The gears 80, it will be noted, act upon the material being fed to the saw at points in front of the saw, while the gears 81 operate on the said material at points at the rear of the saw. The tension of the springs 75 and 79 should, of course, be always less than sufficient to sustain the weight of the frames 65 and 66 and parts carried thereby and it will, of course, be understood that by proper adjustments of the nuts 74 and 78, the tension of said springs may be regulated so as to cause the said gears 80 and 81, under the gravity of the parts, to engage the material being fed to the saw with the desired force or pressure, such force or pressure being, of course, variable as required for different kinds of work. It is also very important to note that the feed wheels 80 and 81 and parts which supports them are adjusted vertically with the supplemental frame 25 and its pedestals 26, so that vertical adjustment of the saw does not vary or change the regulated action of the said feed wheels or gears.

From the foregoing description and statements made, it is evident that by vertical adjustments of the saw the machine may be set for sawing slabs of different thickness without changing or moving the lower feed mechanisms which serve to support and feed the logs, slabs or boards to the saw. It is also obvious that such adjustments of the saw are, by the above described counterpoising devices, made easy to perform by the manipulation of the hand operated lever.

What I claim is—

1. In a horizontal band saw mill, the combination with a relatively fixed main frame, of a supplemental frame spring connected to said main frame, a counter weight supporting a part of the load of said supplemental frame and connected thereto by a lever, the operative length of which increases as said parts are raised and as the force of said supporting spring decreases, substantially as described.

2. In a horizontal band saw mill, the combination with a main frame and feeding mechanism, of a vertically movable supplemental frame in part spring supported from said main frame, a counter weight sustaining a part of the load of said supplemental frame and including a lever, the operative length of which increases when said supplemental frame is raised, saw guiding wheels carried by said supplemental frame, and a horizontal band saw running over said wheels and vertically adjustable with said supplemental frame, substantially as described.

3. In a horizontal band saw mill, the combination with a main frame and supplemental frame, of saw guiding wheels mounted on said supplemental frame, a horizontal band saw running over said guide wheels, spring connections between said main and supplemental frame, in part supporting the weight of said supplemental frame and its load, and a counter weight supporting in part the weight of said supplemental frame and parts carried thereby and including a lever, the operative length of which increases under upward movement of said supplemental frame, and means for vertically adjusting said supplemental frame, at will, to vary the position of the operative portion of the saw, with respect to said feeding mechanism, substantially as described.

4. In a horizontal band saw mill, the combination with a main frame and a supplemental frame, of saw guiding wheels mounted on said supplemental frame, a horizontal band saw running over said guide wheels, a rock shaft mounted on said main frame and having lifting connections to said supplemental frame, springs in part supporting the weight of said supplemental frame and parts carried thereby, and a weighted counter balancing device including an arm connected to said rock shaft and arranged to increase its operative length when said supplemental frame is raised, substantially as described.

5. In a horizontal band saw mill, the combination with a main frame and supplemental frame, of saw guiding wheels mounted on said supplemental frame, a horizontal band saw running over said guide wheel, spring equipped rods in part supporting said supplemental frame from said main frame, a rock shaft having parallel arms, independently adjustable link connections between said arms and said supplemental frame, a weighted counter balancing device including an arm connected to said rock shaft and arranged to increase its operative length when said supplemental frame is raised, and a lever connected to said rock shaft for oscillating the same to raise and lower, at will, the said supplemental frame and parts carried thereby, substantially as described.

6. In a horizontal band saw mill, the combination with a main frame and a supplemental frame, of a rock shaft mounted on said main frame and provided with parallel arms, vertically adjustable links connecting said arms to said supplemental frame, a second rock shaft mounted on said main frame and having arms connected to said links, a weighted counter balancing device connected to one of said rock shafts, and an operating lever connected to said first noted rock shaft, substantially as described.

7. In a horizontal band saw mill, the combination with a band saw and guiding and driving wheels therefor, of a lower feed mechanism for feeding the material to the saw, and an overhead feed device comprising two pivotally connected floating frames, a toothed feed wheel pivotally mounted on each floating frame and working one in front and the other at the rear of the saw, and toothed gears for positively driving said toothed feed wheels, substantially as described.

8. In a horizontal band saw mill, the combination with a band saw, guide wheels and means for driving the same, and means for adjustably supporting said saw and its guide wheels including supporting springs, a counter weight and a compensating connection whereby said weight compensates for decreasing force of said springs under expansion thereof, substantially as described.

In testimony whereof I affix my signature in presence of two witnesses.

HERMANN G. DITTBENNER.

Witnesses:
 MALIE HOEL,
 F. D. MERCHANT.